United States Patent [19]
Huskamp et al.

[11] Patent Number: 5,972,521
[45] Date of Patent: Oct. 26, 1999

[54] EXPANDED METAL STRUCTURE AND METHOD OF MAKING SAME

[75] Inventors: Christopher S. Huskamp, Columbia, Ill.; Donald A. Deuser, Florissant; Daniel S. Schwartz, University City, both of Mo.

[73] Assignee: McDonnell Douglas Corporation, St. Louis, Mo.

[21] Appl. No.: 09/164,781

[22] Filed: Oct. 1, 1998

[51] Int. Cl.$^6$ ........................................................ B22F 3/00
[52] U.S. Cl. ........................ 428/547; 419/2; 419/8; 419/29; 29/527.1; 29/530
[58] Field of Search .................. 419/2, 5, 8, 29; 428/547; 29/527.1, 530

[56] References Cited

U.S. PATENT DOCUMENTS

| | | | |
|---|---|---|---|
| 3,873,392 | 3/1975 | Niebylski et al. | 156/306 |
| 4,059,879 | 11/1977 | Chmura et al. | 29/148.4 R |
| 4,383,809 | 5/1983 | Hoffmüller | 425/78 |
| 4,389,362 | 6/1983 | Larsson | 264/111 |
| 4,591,470 | 5/1986 | Goto et al. | 264/59 |
| 4,594,219 | 6/1986 | Hostatter et al. | 419/8 |
| 4,861,546 | 8/1989 | Friedman | 419/8 |
| 5,152,856 | 10/1992 | Thein et al. | 156/79 |
| 5,174,143 | 12/1992 | Martin | 72/53 |
| 5,186,777 | 2/1993 | Perenon et al. | 156/79 |
| 5,294,399 | 3/1994 | Akiyama | 419/27 |
| 5,564,064 | 10/1996 | Martin | 419/5 |

FOREIGN PATENT DOCUMENTS 63076758  7/1988  Japan .

OTHER PUBLICATIONS

V.N. Chudin et al., Technology of combined deformation and diffusion bonding laminated, load–bearing constructions *Welding International 1996*, 10 (3) pp. 224–227.

*Primary Examiner*—Ngoclan Mai
*Attorney, Agent, or Firm*—Alston & Bird LLP

[57] ABSTRACT

The present invention provides a method of forming a continuous one-piece structural porous metal (SPM) structure having a predetermined geometry. The method the invention includes the steps of preparing a metal billet comprising a metal core formed of a metal and a gas, and solid metal face sheets bonded to opposite sides of the metal core; placing the metal billet in a mold cavity having a predetermined geometry defined by opposing inner surfaces of the mold with at least one of the opposing inner surfaces contacting at least a portion of the metal billet and spaced apart from at least a portion of the metal billet; and heating the metal billet to expand the metal core to form the expanded metal structure. The portion of the metal billet in contact with the inner surfaces of the mold cavity is constrained by these surfaces while the remainder of the metal billet that is spaced apart from at least one of the inner surfaces of the mold is allowed to expand resulting in a one-piece expanded metal structure having a geometry corresponding generally to the geometry of the mold cavity with the constrained portion of the metal structure having a higher density than the remainder of the expanded metal structure. The present invention also includes a continuous one-piece expanded metal structure.

19 Claims, 3 Drawing Sheets

EXPANDED METAL STRUCTURE AND METHOD OF MAKING SAME

FIELD OF THE INVENTION

The present invention relates to structural porous metal structures and more particularly relates to the manufacture of these structures.

BACKGROUND OF THE INVENTION

Structural porous metal (SPM) parts comprising a porous metal core and metal face sheets bonded to opposite sides of the porous metal core have been proposed for use in various applications. For example, U.S. Pat. No. 5,564,064 to Martin describes producing integral metal structures having porous cores for various applications. In Martin, a shell container is initially prepared from a solid metal material, filled with a reactively compatible metal core material and a gas, and sealed. The sealed, gas-filled shell container is heated and hot isostatically pressed to produce a consolidated metal billet wherein the gas is trapped in the metal core. The consolidated billet is then rolled, sectioned and welded together to produce shaped billets having a predetermined geometry. In addition, the billet is often machined to provide predetermined thicknesses across the SPM structure.

The billet is then annealed to force the gas out of solid solution and expand the structure to produce a SPM structure in situ.

Although SPM structures having predetermined geometries can be produced according to the method described in Martin, there are problems associated with this method. In particular, by sectioning and welding together different billets, the material strength and stiffness properties of the SPM structure is decreased. In addition, discontinuities in the shaped SPM structure generally exist at welding points. Furthermore, machining the face sheets of these structures reduces the benefits of forming an in situ sandwich structure.

The negative effects of welding structural pieces together and machining the face sheets to form the desired structure shape are especially noticeable when fasteners are applied to these structures. In particular, any discontinuity at the surface of the structure concentrates stress and provides a point of crack initiation and ensuing failure of the components. In addition, if fasteners are applied in the area of porous expansion, fatigue cracks can initiate at the pores exposed by machining as well as at the interface between the face sheets and the porous metal core and grow at an accelerated rate to failure.

One solution to this problem has been to use some method of cold-working around the drilled holes or thru-machined areas to densify the porous metal core at the edges and increase the fatigue life of the component. Nevertheless, this additional densification step is time-consuming and increases manufacturing cost.

SUMMARY OF THE INVENTION

The present invention provides a method of forming a continuous one-piece structural porous metal (SPM) structure having a predetermined geometry. The SPM structure can be prepared in its final form in a mold without the need to section and weld individual billets or to machine face sheets to produce the desired geometry. Therefore, the strength, stiffness and fatigue resistance of these structures can be maximized. Furthermore, the method of the invention decreases the number of steps needed to produce the SPM structure and thus allows these structures to be produced quickly and at low cost.

In accordance with the invention, a method of forming an expanded metal structure having a predetermined geometry includes first preparing a metal billet comprising a metal core formed of a metal and a gas, and solid metal face sheets bonded to opposite sides of the metal core. The metal billet is placed in a mold cavity having a predetermined geometry defined by opposing inner surfaces of the mold with the opposing inner surfaces contacting at least a portion of the metal billet and spaced apart from at least a portion of the metal billet. Preferably, the mold cavity is defined by two opposing parts, each part including an inner surface corresponding to a predetermined geometry and contacting at least a portion of the metal billet. The metal billet once placed in the mold is then heated to expand the metal core. The expansion of a portion of the metal billet is constrained by contact with the inner surfaces of the mold cavity while the remainder of the metal billet that is spaced apart from at least one of the inner surfaces of the mold is allowed to expand. The resulting one-piece expanded metal structure has a geometry corresponding generally to the geometry of the mold cavity with the constrained portion of the expanded metal structure having a higher density than the remainder of the expanded metal structure.

In one embodiment of the invention, features are provided on the surface of the face sheets. These surface features are produced by placing the metal billet in a mold cavity wherein at least one of the inner surfaces of the mold contains the desired features. When the metal billet is heated and expanded, surface features are produced on the face sheets of the resulting expanded metal structure that correspond to the surface features on the inner surfaces of the mold.

The present invention further includes a continuous one-piece expanded metal structure. The expanded metal structure of the invention includes a porous metal core and continuous metal face sheets bonded to opposite sides of the porous metal core. In accordance with the invention, a portion of the metal core has a higher density than the remainder of the metal core. In addition, the solid metal face sheets have substantially uniform thickness across the expanded metal structure. These solid metal face sheets can also further include surface features. The expanded metal structure can be produced without sectioning and welding metal billets and without machining the solid metal face sheets. Thus the expanded metal structure has increased strength, stiffness, and fatigue resistance over conventional structural porous metal (SPM) structures.

These and other features and advantages of the present invention will become more readily apparent to those skilled in the art upon consideration of the following detailed description and accompanying drawings which describe both the preferred and alternative embodiments of the present invention.

DETAILED DESCRIPTION OF THE PREFERRED EMBODIMENTS

Figure 1:
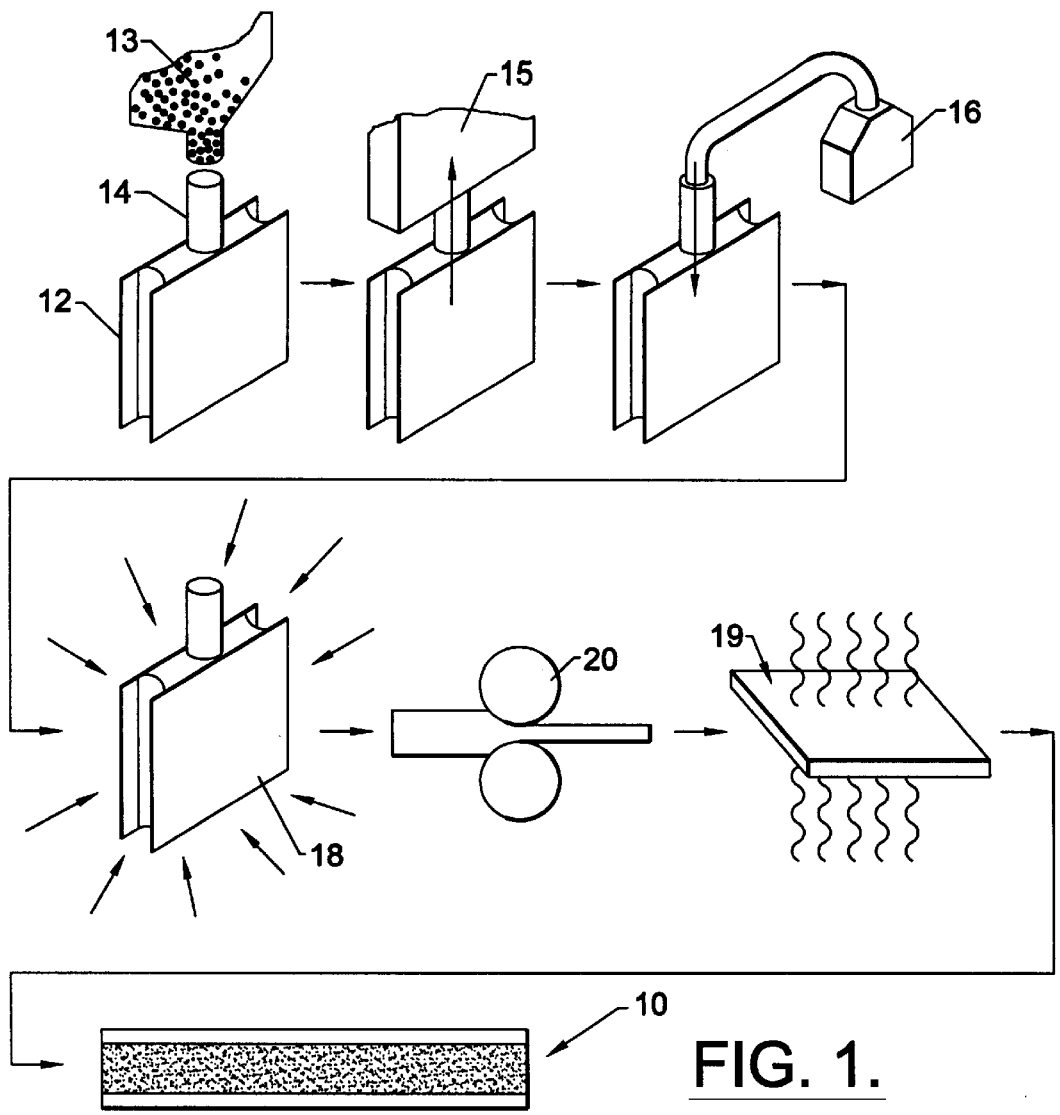
FIG. 1 is a schematic view showing the sequential stages of one method of producing a metal structure according to the invention wherein metal particulates are used as the core material.

In the drawings and the following detailed description, preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description and accompanying drawings. In the drawings, like numbers refer to like elements throughout.

Referring now to FIG. 1, there is shown a method of producing a metal structure 10 for use in the invention. According to this method, a metal container or shell 12 is first prepared by conventional metal forming techniques using any desired initial stock material. For example, individual solid metal sheets can be welded together to form a desired geometrical shape for the metal shell 12, e.g., a cylinder or rectangular box.

Figure 2:
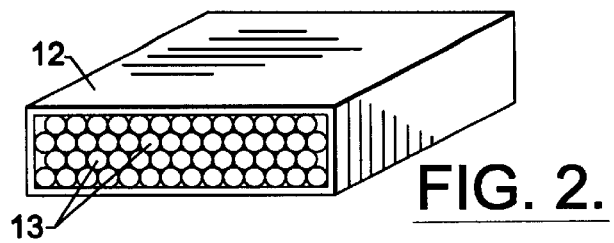
FIG. 2 is a cross-sectional view of an alternative embodiment of the invention wherein metal rods are used as the core material.

Once the metal shell 12 is formed, metal core material 13 can be placed in the metal shell. As shown in FIG. 1, the metal shell 12 can be fitted with a fill-tube 14 and the metal core material 13 can be in the form of metal particulates introduced into the metal shell through the fill-tube. The metal particulates can be in the form of shavings, powders, chips, punchings and the like. Alternatively, the metal core material 13 can be in the form of metal rods as shown in FIG. 2, or in the form of metal wires, bars, tubes, or solid billets containing open voids or channels. The choice of the metal core material 13 used generally depends on the final structure and properties desired for the core material. For example, the final pore structure can be discrete and cellular in nature for general application stress loads, or continuously channel-like and oriented in a single direction for directional loads. If continuous rods or tubes are used as the initial core material 13, the core pore structure (after expansion of the metal structure) can incorporate continuous, open channels throughout the length of the finished product. Alternatively, use of a particulate metal core material 13 can produce a final cellular pore structure for use with general application stress loads.

The metal shell 12 and metal core material 13 can be formed of any metal, metal alloy or composite, and can be the same or different, depending on the desired properties for the specific end use. Preferably, for aerospace applications, the metals used for the metal shell 12 and the metal core material 13 are high strength metals or metal alloys such as titanium and titanium alloys; aluminum and aluminum alloys; nickel and nickel alloys (including nickel superalloys); titanium, aluminum and vanadium alloys; aluminum and copper alloys; aluminum and beryllium alloys; and the like. If the core material 13 is going to be formed of a metal alloy, the core material can be provided as a blend of elemental component metal particulates in the weight ratio desired for the alloy. Preferably, the metal shell 12 and metal core material 13 are formed of titanium or titanium alloys. In addition, the metals selected for the metal shell 12 and core material 13 preferably do not combine to adversely affect the strength and other desirable properties of the final expanded SPM material.

In accordance with the invention, the metal core material 13 used to form the metal structure 10 can be coated with a small amount of a release agent (e.g. a 1 mil thick coating). The release agent can be used to reduce the internal diffusion bonding of the core material 13 when the metal shell 12 and core material are consolidated thus facilitating the formation of pores in the core material during later expansion of the metal structure 10. However, the release agent should not interfere with the diffusion bonding between the metal shell 12 and the core material 13. Therefore, where possible, the release agent should preferably not be provided between the core material 13 and the metal shell 12. The release agent is preferably a reactively compatible material and suitable release agents include boron nitride, polytetrafluoroethylene (PTFE or TEFLON®), silica and yttrium oxide. Advantageously, certain release agents can also allow the desired amount of expansion to occur at lower temperatures. For example, boron nitride has been found to have this effect with titanium/vanadium/aluminum alloys.

Once the core material 13 has been introduced into the shell 12, the interior of the shell is preferably vacuum-evacuated by appropriate means 15, e.g., to between about $10^{-2}$ and $10^{-5}$ torr, to prevent ambient air and moisture from reacting with the core material. The metal shell 12 is then filled with a gas from an appropriate source 16. Preferably, the gas is provided in the metal shell 12 with a high enough pressure to permit ready expansion of the core material 13 during the subsequent processing steps, yet not so high that it creates undue difficulty during the consolidation of the metal shell and core material. Typically, the gas is provided at a pressure of between 1 and 10 atmospheres. The pressure used in the invention is dependent on numerous factors including the face sheet material used and particularly the yield strength of this material.

In accordance with the invention, numerous gases can be supplied by the source 16 including the inert gases (e.g. helium and argon), nitrogen, and, in some cases, ambient air. The choice of gases for use with the invention depends on the metals being used in the metal structure. Preferably, the gas is substantially unreactive with the core material 13 and the metal shell 12 both during manufacture and use of the SPM material. At the least, any reactivity between the gas and metal should not adversely affect the strength of the final product. For example, using hydrogen as the gas in titanium structures is undesirable because of the formation of hydrides in the final product. Therefore, inert gases are preferably used with titanium.

Once the gas is introduced into the shell 12, the shell is sealed. The shell 12 can be sealed by any conventional manner such as by crimping, welding, or the like. The sealed metal shell 12 and core material 13 are then consolidated using heat and pressure to produce an intermediate metal product or billet 18. The sealed metal shell 12 and core material 13 can be consolidated by any conventional technique that is sufficient to effect flow and diffusion bonding of the shell and metal core material to produce a dense, solid product without any permanent pore structure. As is well-known in the art, solid state diffusion bonding is a metal interface phenomenon in which metal surfaces, at a suitable elevated temperature and under sufficient pressure applied to their mating surfaces, undergo a diffusion of metal atoms across the boundary interface to such an extent that subsequently no interface can be determined. Exemplary consolidation techniques for use in the invention depend on the metals used and include hot compaction in an open die, hot isostatic pressing, billet compaction in an extrusion press liner, and other techniques such as those described in ASM Metals Handbook, Ninth Edition, Volume 7, pp. 295–492, 533–550. Typically, to produce good diffusion bonding between the shell 12 and metal core material 13, the external pressure used during consolidation exceeds the internal gas pressure of the sealed shell container. In addition, the temperature is sufficiently high to effect metal flow and diffusion to create metallurgical bonds within the metal core, and between the metal core material 13 and the metal shell 12, but not so high that is causes the metals to melt. As an example of a suitable consolidation method, titanium metal or titanium alloy billets can be consolidated by hot isostatic pressing at temperatures between about 1650° F. and about 1800° F. under pressures of between about 10,000 and about 25,000 psi, and for periods of from about 1 and about 3 hours. Of course, specific conditions utilized for consolidation will vary depending upon the composition of the metal core material 13 and the metal shell 12, the configurations and thicknesses of these materials, and the particular consolidation technique used.

The intermediate metal billet 18 is thereafter deformation processed by any conventional forming operation that produces a shaped metal billet 19. In FIG. 1, the intermediate metal billet 18 is deformation processed by passing it through rollers 20. However, in addition to rolling, extruding and forging can also be used in accordance with the invention. For some metals, deformation processing will actually enhance both metallurgical bonding between the core material constituents 13, and between the core material and metal shell 12. For example, deformation processing of titanium or titanium alloy consolidated billets can be effected by rolling at about 5 to 20% reductions per pass using furnace soaking temperatures of from about 1500° F. to 1700° F.

The metal billet 19, once prepared according to the method described above or by alternative methods, comprises a metal core 22 formed of a metal and a gas, and solid metal face sheets 24 bonded to opposite sides of the metal core. The metal billet 19 is then further processed according to the invention. In particular, the metal billet 19 is typically placed into a mold or similar forming means as shown in FIG. 3–8. The mold can include a one-part tooling means or a two-part tooling means as illustrated in FIGS. 3–6 and 7–8, respectively.

Figure 3:
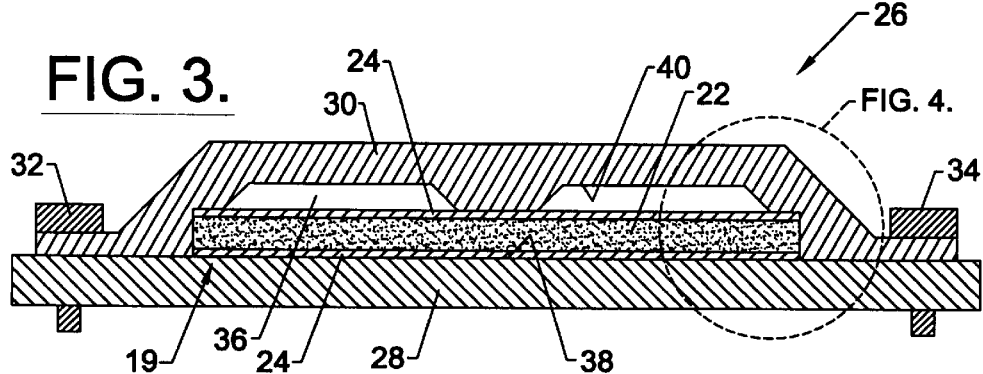
FIG. 3 is a cross-sectional view of a metal billet in a mold prior to expansion according to the invention.
Figure 4:
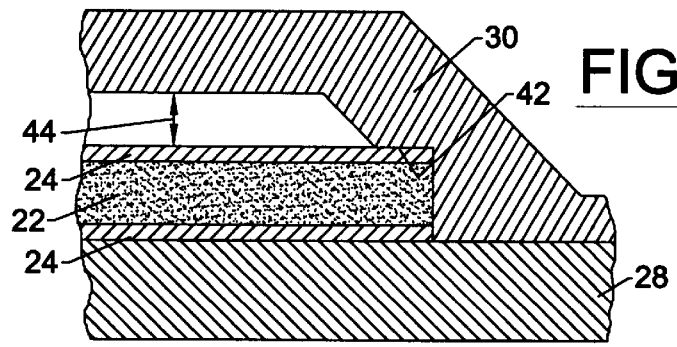
FIG. 4 is an enlarged view of a portion of FIG. 3 demonstrating portions of the metal billet in contact with the mold and portions spaced apart from the metal structure.

In the embodiment illustrated in FIGS. 3–6, the mold 26 comprises a table 28 and a molding tool 30 preferably formed of stainless steel or a similar material. The table 28 and tool 30 are connected together using appropriate means such as bolts 32 and 34. The space between the table 28 and tool 30 defines a mold cavity 36. As shown in FIG. 3, the metal billet 19 is placed between the table 28 and the tool 30 in the mold cavity 36. The table 28 has a generally planar inner surface 38 for supporting the metal billet 19. The tool 30 has a non-planar inner surface 40 adjacent the metal billet 19 and along with the surface 38 forms a desired geometry for the mold cavity 36. As shown in FIG. 4, the inner surface 40 of the tool 30 contacts at least a portion of the metal billet 19 as shown, e.g., at interface 42, and is spaced apart from at least a portion of the metal billet as shown, e.g., by double arrow 44.

Once the metal billet 19 is secured within the mold cavity 36, the metal billet is heated (annealed) to evolve the gas from solid solution and thereby expand the metal core 22 and the metal billet. Preferably, the metal billet 19 is heated to a temperature and for a period of time sufficient to evolve the gas in the solid core to form permanent voids or channels therein without melting the metal core material. For example, the heat treatment of titanium and titanium alloy materials can occur at temperatures of between about 1650° and about 2500° F. for periods of from about 4 to about 48 hours. As will be understood by those skilled in the art, the specific conditions utilized for heat treatment depend upon the particular compositions and the final configuration and properties desired for the expanded metal structure 10.

Figure 5:
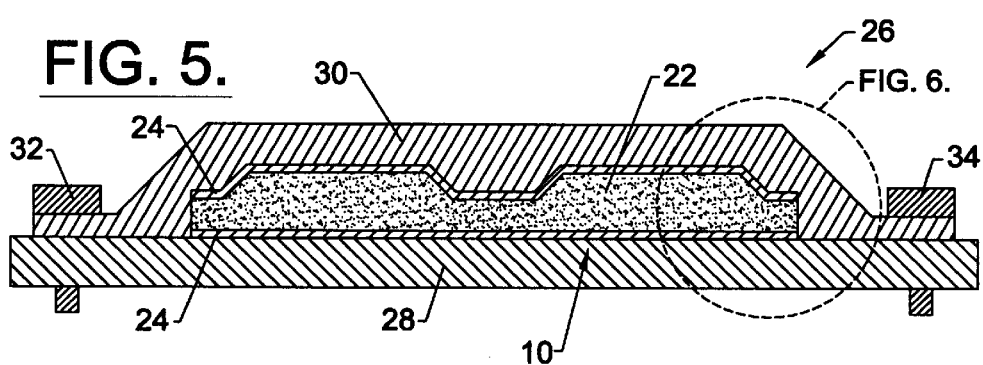
FIG. 5 is a cross-sectional view of the metal structure in FIGS. 3 and 4 after expansion of the metal billet according to the invention.
Figure 6:
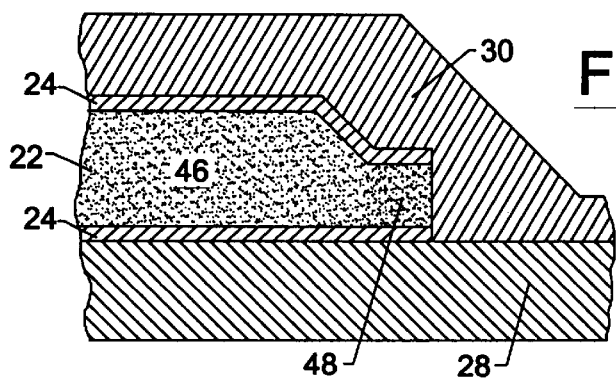
FIG. 6 is an enlarged view of the portion of the metal structure in FIG. 4 after expansion of the metal billet and demonstrating the porous core and densified areas.

In accordance with the invention, during expansion of the metal billet 19, the mold 26 allows expansion of the portion of the metal billet that is spaced apart from at least one of the inner surfaces 38 and 40 of the mold and constrains expansion of the portion of the metal billet that is in contact with these inner surfaces. As shown in FIGS. 5–6, the resulting expanded metal structure 10 has a geometry corresponding generally to the geometry of the mold cavity 36. As illustrated in FIG. 6, the portions of the metal billet 19 that are allowed to expand (e.g. section 46) result in a relatively low density, porous core. The portions of the metal billet 19 constrained during the expansion process (e.g., section 48) result in a relatively dense core. These denser portions in the expanded metal structure 10 are stronger and have increased fatigue resistance over the more expanded portions. Thus, holes can be drilled in these denser portions of the metal structure 10 and fasteners applied thereto without causing cracking or other failures in the structure.

Figure 7:
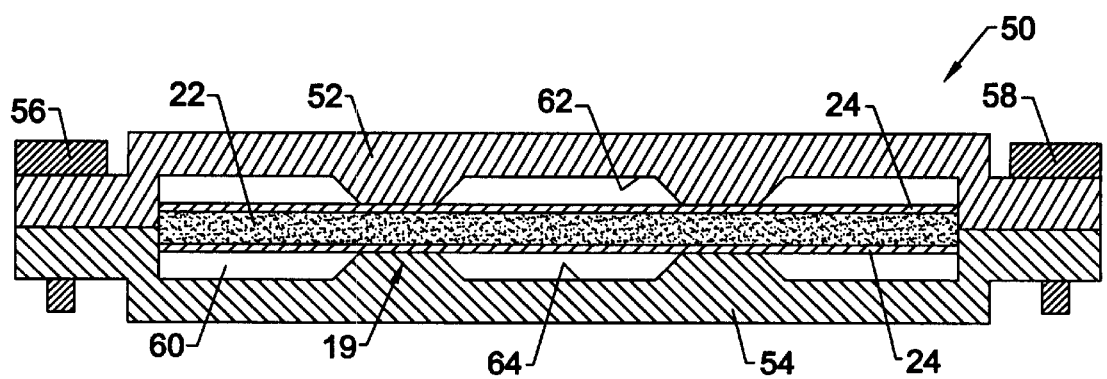
FIG. 7 is a cross-sectional view of a metal billet in a two-part mold prior to expansion according to the invention.
Figure 8:
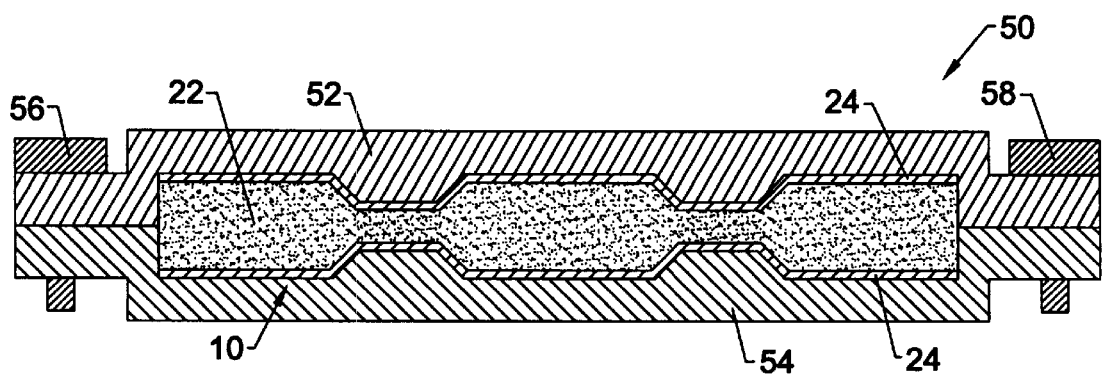
FIG. 8 is a cross-sectional view of the expanded metal structure after heating the metal billet in FIG. 7 according to the invention.

FIGS. 7–8 illustrate an alternative embodiment of the invention wherein a two-part tooling means is used to produce the expanded metal structure 10. As shown in FIGS. 7–8, the mold 50 comprises an upper tool 52 and a lower tool 54 connected together by appropriate means such as bolts 56 and 58. The space between the upper tool 52 and lower tool 54 defines a mold cavity 60. As shown in FIG. 7, the metal billet 19 is placed between the upper tool 52 and lower tool 54 in the mold cavity 60. The upper tool 52 and lower tool 54 both have non-planar inner surfaces, 62 and 64, respectively, and form the desired geometry for the mold cavity 60. As shown in FIG. 7, these inner surfaces 62 and 64 contact at least a portion of the metal billet 19 and are spaced apart from at least a portion of the metal billet. During expansion of the metal billet 19, the mold 50 allows expansion of the portion of the metal billet that is spaced apart from at least one of the inner surfaces 62 and 64 and constrains expansion of the portion of the metal billet that is in contact with these inner surfaces. FIG. 8 illustrates the resulting expanded metal structure 10.

In either of the embodiments described above, the tools can further include surface features. These surface features can, e.g., be in the form of patterns, labels, or other features that can be used to identify the expanded metal product. As the metal billet 19 expands, the face sheets 24 are forced against the inner surfaces of the mold thereby transferring these surface features to the outer surfaces of the face sheets 24.

The method of the invention can be used to form in situ integral, sandwich structures having excellent structural stability. The expanded metal structure of the invention can be formed into a desired geometry without sectioning and welding sections together and without machining the face sheets. As a result, the expanded metal structure of the invention is a continuous one-piece expanded metal structure with high strength, stiffness, and fatigue resistance that maintains the benefits of the sandwich structure formed during the diffusion bonding process. Furthermore, the porous metal core includes regions having a higher density than the remainder of the metal core that are useful for affixing fasteners to the metal structure. In addition, the solid metal face sheets bonded to opposite sides of the porous core have a substantially uniform thickness across the expanded metal structure.

The resulting structures produced according to the invention can be used for various applications. For example, these structures can be used for vehicles such as aircraft, missiles, spacecraft, launch vehicles, ground vehicles, ground support equipment, ships, submarines, and the like.

It is understood that upon reading the above description of the present invention and reviewing the accompanying drawings, one skilled in the art could make changes and variations therefrom. These changes and variations are included in the spirit and scope of the following appended claims.

That which is claimed:

1. A method of forming an expanded metal structure having a predetermined geometry, comprising the steps of:
   preparing a metal billet comprising a metal core formed of a metal and a gas, and solid metal face sheets bonded to opposite sides of the metal core;
   placing the metal billet in a mold cavity, said cavity having a predetermined geometry defined by opposing inner surfaces of the mold, at least one of the inner surfaces contacting at least a portion of the metal billet and spaced apart from at least a portion of the metal billet;
   heating the metal billet to expand the metal core such that said mold allows expansion of the portion of the metal billet that is spaced apart from at least one of the inner surfaces of the mold and constrains expansion of the portion of the metal billet that is in contact with the inner surfaces of the mold, the resulting expanded metal structure having a geometry corresponding generally to the geometry of the mold cavity.

2. The method according to claim 1 wherein said placing step comprises placing the metal billet in a mold cavity defined by two opposing parts, each part comprising an inner surface corresponding to a predetermined geometry, and the inner surface of each part intimately contacting at least a portion of the metal billet and spaced apart from at least a portion of the metal billet.

3. The method according to claim 1 wherein said placing step comprising placing the metal billet in a mold cavity wherein at least one of the inner surfaces of the mold contains features, and said heating step further comprising heating the metal billet to produce surface features on the face sheets of the resulting expanded metal structure that correspond to the surface features of the inner surfaces of the mold.

4. The method according to claim 1 wherein said heating step comprises heating the metal billet to a temperature below the melting point of the metal in the metal core.

5. The method according to claim 1 wherein said preparing step includes diffusion bonding the metal face sheets to the metal core.

6. The method according to claim 1 wherein said preparing step comprises preparing a metal billet wherein the face sheets are formed of titanium or a titanium alloy.

7. The method according to claim 1 wherein said preparing step comprises preparing a metal core comprising metal particulates.

8. The method according to claim 1 wherein said preparing step comprises preparing a metal core comprising metal rods or tubes.

9. The method according to claim 1 wherein said preparing step comprises:
   preparing a solid metal container including solid metal face sheets;
   filling the container with a metal core material and a gas that is not reactive with the metal core material;
   sealing the container; and
   applying heat and pressure to the sealed container to produce internal diffusion bonding of the metal core material and diffusion bonding of the metal core material to the face sheets to thereby produce a metal billet.

10. The method according to claim 1 wherein said preparing step comprises preparing a metal billet comprising a metal core formed of a metal selected from the group consisting of titanium, nickel, aluminum, aluminum-beryllium alloys, and combinations thereof.

11. An expanded metal structure having a predetermined geometry and formed according to the method of claim 1.

12. The method of forming an expanded metal structure having a predetermined geometry comprising the steps of:
   preparing a metal billet comprising a porous metal core and solid metal face sheets bonded to opposite sides of the porous metal core;
   placing the metal billet in a two part tooling mold, each of the two parts of the tooling mold having an inner surface corresponding to a predetermined geometry, the inner surfaces of the mold contacting at least a portion of the metal billet and not contacting the remainder of the metal billet;
   heating the metal billet such that the mold allows expansion of the portion of the metal billet that is not in contact with the mold and constrains expansion of the portion of the metal billet that is in contact with the mold, said heating step producing an expanded metal structure having a geometry corresponding generally to the geometry of the mold.

13. A method of forming an expanded metal structure having a predetermined geometry comprising the steps of:
   preparing a metal billet comprising a porous metal core and solid metal face sheets bonded to opposite sides of the porous metal core;
   placing the metal billet in a mold corresponding to a predetermined geometry and containing features on an inner surface adjacent the metal billet, the mold contacting at least a portion of the metal billet and not contacting at least a portion of the metal billet;
   heating the metal billet such that the mold allows expansion of the portion of the metal billet that is not in contact with the mold, constrains expansion of the portion of the metal billet that is in contact with the mold, and transfers the surface features from the inner surface of the mold to the face sheets of the metal billet, the resulting expanded metal structure having a geometry corresponding generally to the geometry of the mold and surface features corresponding to the surface features of the mold.

14. A method of forming an expanded metal structure having a predetermined geometry, comprising the steps of:
   preparing a metal billet comprising a metal core formed of a metal and a gas, and solid metal face sheets bonded to opposite sides of the metal core;
   placing the metal billet in a mold cavity, said cavity having a predetermined geometry defined by opposing inner surfaces of the mold;
   heating the metal billet to expand the metal billet;

constraining the expansion of a portion of the metal billet by contact with the inner surfaces of the mold cavity while allowing expansion of the remainder of the metal billet, the resulting one-piece expanded metal structure having a geometry corresponding generally to the geometry of the mold cavity with the constrained portion of the metal structure having a higher density than the remainder of the expanded metal structure.

15. An expanded metal structure formed according to the method of claim 14.

16. A continuous one-piece expanded metal structure comprising:

a porous metal core, a portion of said metal core having a higher density than the remainder of the metal core; and continuous solid metal face sheets bonded to opposite sides of the porous metal core, said solid metal face sheets having substantially uniform thickness across the expanded metal structure.

17. The continuous one-piece expanded metal structure of claim 16 wherein said solid metal face sheets include surface features.

18. The continuous one-piece expanded metal structure of claim 16 wherein said face sheets are formed of titanium or a titanium alloy.

19. The continuous one-piece expanded metal structure of claim 16 wherein said metal core is formed of a metal selected from the group consisting of titanium, nickel, aluminum, aluminum-beryllium alloys, and combinations thereof.

* * * * *